Oct. 12, 1965  R. A. FLINN  3,211,361
METHOD OF PRODUCING A VACUUM
Filed Feb. 7, 1963

INVENTOR.
RICHARD A. FLINN
BY *Shanley & O'Neil*
ATTORNEYS.

United States Patent Office 3,211,361
Patented Oct. 12, 1965

3,211,361
METHOD OF PRODUCING A VACUUM
Richard A. Flinn, Emmaus, Pa., assignor to Air Products and Chemicals, Inc., a corporation of Delaware
Filed Feb. 7, 1963, Ser. No. 257,021
5 Claims. (Cl. 230—69)

The present invention relates to methods for producing a vacuum. The method of the present invention is useful in all cases in which a chamber is to be evacuated, and is particularly useful in the evacuation of large chambers to be maintained at low temperature for the simulation of conditions at very high altitude or in outer space.

It is therefore an object of the present invention to provide methods for producing and maintaining a desired degree of vacuum for extended periods of time.

Another object of the present invention is the provision of methods for producing and maintaining a vacuum in a large chamber.

Still another object of the present invention is the provision of methods for producing and maintaining a vacuum when the ambient of the evacuated space is at very low temperature.

A still further object of the present invention is the provision of methods for producing and maintaining a vacuum, in which the evacuated space does not become contaminated with extraneous vapors.

Yet another object of the present invention is the provision of methods for producing a vacuum, in which predetermined components of the gaseous mixture in the space to be evacuated may be selectively removed leaving substantially only other predetermined components of the original gaseous mixture.

Finally, it is an object of the present invention to provide methods for producing a vacuum, that are relatively simple and inexpensive to practice and that produce uniform results and are dependable, and that may be practiced with equipment that is relatively easy and inexpensive to fabricate and operate.

Figure 1:
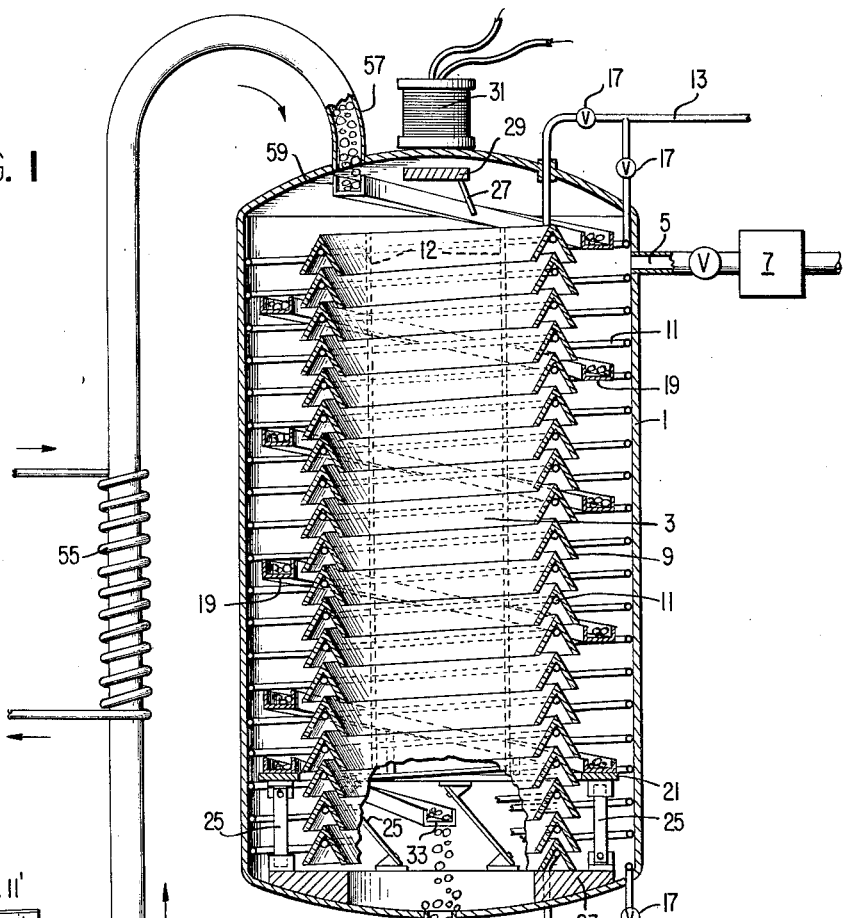
Figure 2:
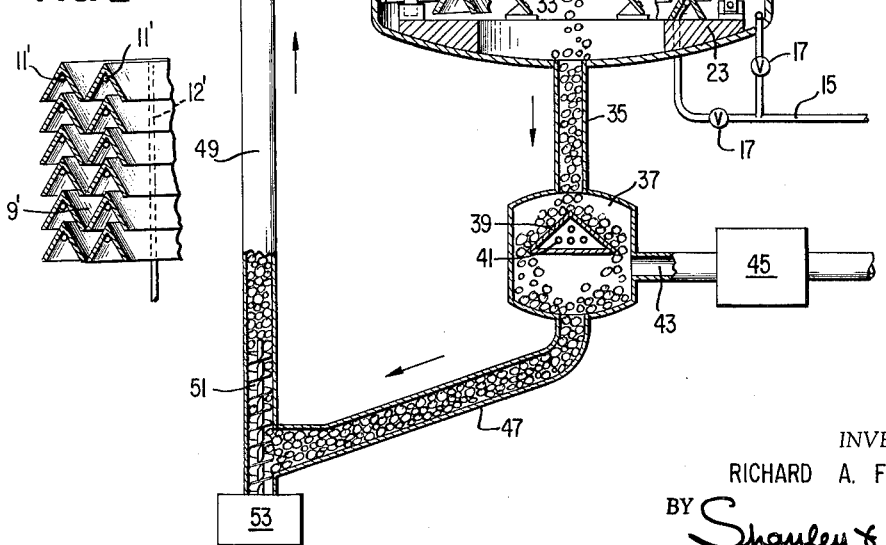

Other objects and advantages of the present invention will become apparent from a consideration of the following description, taken in connection with the accompanying drawing, in which:

FIGURE 1 is a somewhat schematic view in elevation, with parts in cross section, of equipment for practicing the method of the present invention; and FIGURE 2 is a fragmentary view of a portion of FIGURE 1 showing a modified form of apparatus for use in practicing the invention.

Referring now to the drawing in greater detail, there is shown apparatus for carrying out the methods of the present invention, comprising a closed vessel 1 of generally cylindrical shape, which may be as large as desired in order to define an evacuated chamber 3 of a size appropriate to the purpose for which the equipment is provided. As is conventional, vessel 1 is provided with a valved evacuation conduit 5 having a pump 7 therein for rapidly reducing the pressure in the chamber 3 by removing most of the gas therefrom.

In order to maintain the temperature of the ambient which surrounds chamber 3 at a desirably low level, a generally cylindrical radiation shield 9 is provided within chamber 3 spaced inwardly from the side walls of vessel 1 and preferably concentric with vessel 1. Shield 9 is in the form of a helix of inverted V-shaped cross section. A conduit 11 is disposed in helical configuration in the apex of the inverted V of shield 9. A plurality of rods 12 support the turns of shield 9. The V or chevron shape of the turns of shield 9 permits the inner and outer portions of chamber 3 to "see" conduit 11 but not to "see" each other. At the same time, gas can flow freely through shield 9. Another branch of conduit 11 is helically disposed about the inner surface of vessel 1. A suitably low-boiling heat transfer fluid such as liquid helium circulates through both branches of conduit 11 continuously to and from a source of the liquid heat transfer fluid (not shown) which may for example include the usual compressor and expander (not shown). In any event, the cooling fluid enters the branches of conduit 11 at their entrance ends 13 and leaves the branches of conduit 11 after circulating about vessel 1 and radiation shield 9 at the exit ends 15 of conduit 11. The flow of this fluid through conduit 11 may be controlled in any desired manner by manipulation of valves 17.

Vessel 1 is also provided with at least one entry port (not shown) having an appropriate hermetically sealable closure, so that access may be had to the interior of chamber 3 from the outside prior to the evacuation of the vessel.

As is well known, conventional pumping equipment such as is indicated at 7 is inadequate to maintain the interior of a desirably large chamber at a desirably low pressure for a suitably long time. Accordingly, the heart of the present invention comprises the provision of a stream of solid, divided adsorbent material that flows through the chamber at low temperature and adsorbs gas remaining in the chamber after the crude evacuation has been performed by pump 7. This solid but fluent adsorbent material then leaves the chamber, is stripped of at least a portion of its adsorbed gas by heating, is cooled again and returned to the inlet of the chamber whence it repeats its passage through the chamber.

To this end, there is provided a helical ramp 19 in the form of an upwardly open elongated trough disposed in a generally cylindrical helix about a vertical axis that preferably coincides with the axis of vessel 1 and radiation shield 9. Ramp 19 is supported at its lower end on an annular support 21 which in turn is supported on a ring 23 secured in a lower portion of vessel 1. A plurality of bar springs 25 are secured fixedly at their upper ends to annular support 21 and at their lower ends to ring 23 and are inclined. Bar springs 25 thus resiliently support ramp 19 for limited vertical movement, and their inclination assures that any vertical movement of ramp 19 will be accomponied by a substantial component of horizontal movement. Indeed, on flexure of bar springs 25, all points on ramp 19 will follow the generally arcuate path of movement of the upper ends of bar springs 25. Ramp 19 thus comprises a spiral reciprocatory conveyor, and bar springs 25 are inclined in such a direction relative to the inclination of ramp 19 that upon reciprocatory movement of ramp 19 on springs 25, the material resting on ramp 19 will be urged down the incline of ramp 19. The conveyor action of a spiral ramp mounted on inclined springs in the manner of the illustrated embodiment of the present invention is explained in greater detail in U.S. Patents Nos. 2,658,609 and 2,799,383 to which reference is had for a more complete description of this conveying principle. Of course, to make material go down the ramp instead of up the ramp as in those patents, it is necessary to reverse the direction of inclination of the springs.

In order to cause ramp 19 to reciprocate at the natural frequency of springs 25, a spider 27 is supported on the uppermost turn or two of ramp 19 and carries a plate 29 in unitary assembly with ramp 19. Plate 29 is disposed centrally of chamber 3 on the axis of ramp 19 and is of a ferrous metal such as iron or steel. An electromagnet 31, also disposed coaxially with ramp 19, is supported on the outer side of vessel 1 and is spaced from plate 29 by a gap that, on the average, is as small as possible. Periodic energization of electromagnet 31, at the natural frequency of springs 25 under the load in question, thus attracts plate 29 and imparts to spiral ramp 19 its characteristic conveying movement.

Of course, any number of means could be provided for causing the adsorbent material to move through chamber 3, such as fixed chutes or screw conveyors or the like; but regardless of the form of conveyor or chute that is chosen, it is preferred that there be no lubricated surfaces or electrical windings disposed within the chamber to be evacuated, so as to avoid outgassing from lubricant or the coating of the winding at the very low pressures within the chamber. The illustrated conveyor meets this criterion by eliminating all relative movement of parts in the chamber other than relative movement due to the flexure of bar springs 25.

The solid particles of adsorbent material progressively remove more and more gas from the chamber as they move down spiral ramp 19 at a rate predetermined by the quantity of adsorbent fed to the ramp and by the size and inclination of the ramp and by the natural frequency of springs 25 under the load in question. The adsorbent falls from the lower or discharge end 33 of ramp 19 into the upper end of a vertically disposed discharge conduit 35 through which the adsorbent is conveyed by gravity to a desorption chamber 37. A heater 39 is disposed in desorption chamber 37 beneath the lower end of discharge conduit 35, and heater 39 is of such shape and is so positioned that it somewhat restricts the egress of adsorbent from the lower end of discharge conduit 35, so that at least the lower end of discharge conduit 35 tends to be full of adsorbent. In the illustrated embodiment, heater 39 has thin metal walls and inclined upper sides and is hollow and contains a plurality of heating coils 14 which may be electric-resistance heated or may be tubes heated by a relatively warm fluid. An evacuation conduit 43 communicates with the desorption chamber 37, and a vacuum pump 45 in conduit 43 maintains desorption chamber 37 at a desirably low pressure despite the fact that adsorbent passing over heater 39 becomes warmed and at least a portion of the adsorbed gas is thus given off in desorption chamber 37.

The pressure in desorption chamber 37, although very low, will nevertheless be substantially higher than that in evacuated chamber 3, due to the stripping of the adsorbed gas from the adsorbent under the influence of heater 39. However, the pressure in desorption chamber 37 will still be so low that the gas molecules will have relatively long mean free paths. Under such conditions of low pressure and long mean free path, the movement of gas from the relatively higher pressure region of desorption chamber 37 to the relatively lower pressure region of evacuated chamber 3 will be almost completely impeded by the adsorbent in at least the lower end of discharge conduit 35; and hence it will be seen that the presence of adsorbent in at least the lower end of discharge conduit 35 is an important feature of the present invention.

The at least partially stripped and relatively warmer adsorbent leaves desorption chamber 37 and flows by gravity through an inclined conduit 47 to the lower end of a return conduit 49, where it is picked up by a screw conveyor 51 and urged upwardly. Screw conveyor 51 extends only part way up conduit 49 and is driven by a motor and gear reduction unit 53 at a desirably slow speed. The speed of screw conveyor 51, however, need not be nicely regulated, for the only conveying action imparted to the material in returning conduit 49 by screw conveyor 51 is by forcing material upwardly from below; and screw conveyor 51 therefore cannot move material upwardly in return conduit 49 faster than screw conveyor 51 receives material from incoming conduit 47. In general, therefore, the movement of material through discharge conduit 35 and return conduit 49 will be at the same rate regardless of the speed at which screw conveyor 51 is operated. Sharp corners are avoided in conduit 49 so as to avoid the clogging of the returning material.

As the warmed and stripped adsorbent moves upwardly through return conduit 49, it passes through a cooling zone produced by cooling coils 55 through which a suitably low-boiling coolant such as liquid nitrogen or liquid hydrogen or liquid helium is continuously circulated. The adsorbent is thus returned to the discharge end 57 of return conduit 49, whence it falls upon the upper or feed end 59 of spiral ramp 19 to be cycled through the evacuated chamber, and so on in a continuous process.

A further embodiment of heat shield is seen in FIGURE 2, in which primed reference numerals refer to parts corresponding to FIGURE 1. In FIGURE 2, the helix of shield 9' is of double chevron configuration and two conduit branches 11' occupy the interiors of the apices. The inner portion of chamber 3 can thus "see" only the inner conduit branch 11', while the outer portion of chamber 3 can "see" only the outer conduit branch 11'. The inner and outer chamber portions can thus be maintained at distinctively different temperatures by varying the temperatures of the fluid in the various conduit branches.

To illustrate the present invention in a more specific embodiment, let it be assumed that the evacuated chamber is an outer space simulation chamber for the testing of outer space vehicles and components, and that vessel 1 is 125 feet in length and 40 feet in diameter. Cylindrical radiation shield 9 of FIGURE 1 is 105 feet long and 25 feet in internal diameter. The adsorbent is activated charcoal having an average particle diameter of 2 millimeters. The charcoal enters the upper end of the evacuated chamber at a temperature of 60° K. and at a rate of 62 kg./hr. The vessel has been first roughly evacuated by operation of pump 7 and then the valve of conduit 5 has been closed, and the adsorbent has been flowing through the cycle a sufficiently long time that the vessel has reached temperature and pressure equilibrium. In this condition, the pressure in chamber 3 is $10^{-5}$ torr ($1 \times 10^{-5}$ mm./Hg). The outer portion of chamber 3 "sees" both branches of conduit 11, in which liquid helium is flowing, and is thus maintained at a temperature of 60° K. But the inner portion of chamber 3 "sees" only one branch of conduit 11 and is at a temperature of 100° K. The adsorbent, in the course of its passage through the evacuated chamber, increases its load of adsorbed gas from about 1 cc. per gram (STP) to about 10 cc. per gram.

As the charged adsorbent passes through desorption chamber 37, it is heated by heater 39 to 150° K., at which temperature the adsorbed gas is stripped off to a residual value of about 1 cc. per gram (STP). The pressure in desorption chamber 37 is maintained at $10^{-2}$ torr by pump 45.

Upon passing back through return conduit 49, the stripped adsorbent is cooled to 60° K. by passage in heat-exchange relationship with cooling coils 55 through which liquid helium circulates.

In general, the adsorbent inlet temperature will range from 20 to 200° K., and preferably no higher than about 100° K., and the adsorbent temperature after contact with heater 39 will be from 90 to 300° K., preferably no higher than about 200° K. The vacuum in chamber 3 will range from $10^{-4}$ to $10^{-10}$ torr, and in desorption chamber 37 from $10^{-1}$ to $10^{-7}$ torr. In other words, it is convenient to maintain a thousand fold pressure difference between desorption chamber 37 and evacuated chamber 3 by means of the long mean free path of the gas molecules at low pressure, in combination with a quantity of desorbent in at least the lower end of discharge conduit 35. It is also possible to maintain the pressure differential by so reducing the diameter of conduit 35 that it is less than the mean free path of the gas molecules at the temperature and pressure in question, and also by so extending conduit 35 that it is at least twice as long as it is wide. For example, at least in a relatively long conduit 35, the end of conduit 35 adjacent chamber 37 would be at a pressure close to the pressure of chamber 37, while the end of conduit 35 adjacent chamber 3 would be at a pressure close to the pressure of chamber 3, so that the latter end of conduit 35 might serve to prevent backflow even if the former end of conduit 35 did not. However, when adsorbent is maintained in at least the lower end of the discharge conduit, as described, special dimensions for the discharge conduit are unnecessary other than those which will assure the retention of a quantity of adsorbent in the discharge conduit. Of course, there will also always be adsorbent in conduit 49.

It is also to be noted that the nature of the adsorbent governs the nature of the residual gas in chamber 3. In the case of charcoal, as in the illustrated embodiment, all gases tend to be adsorbed except helium, hydrogen and neon. Silica gel and certain of the molecular sieves adsorb the same gases as charcoal. Certain other molecular sieves, however, are largely selective to helium, hydrogen and neon but tend to leave behind oxygen, nitrogen and argon. Therefore, it is obvious that an atmosphere of any desired composition can be obtained by the use of a particular adsorbent or by a mixture of adsorbents. For example, to remove helium, hydrogen and neon as well as oxygen, nitrogen and argon, a mixed adsorbent could be used. Therefore, the composition of the atmosphere at any altitude can be simulated simply by regulation of the nature and proportion of the components of the adsorbent. Above all, it is to be noted that the relatively inert gases such as the rare atmosphere gases and helium can be removed from the chamber, as distinguished from prior art gettering techniques in which only the more reactive gases could be removed.

It will also be recognized that the present invention is particularly well adapted for the production of vacuum in a very low temperature environment, for the adsorptive capacity of the adsorbent tends to vary inversely as the temperature, and this is another distinction of the present invention over known gettering techniques for maintaining high vacuum. Also, the low temperature to which the present invention is best suited, in combination with the solid nature of the adsorbent, assures that out-gassing and the introduction of extraneous vapors into the vacuum chamber will be kept to a minimum.

In view of the foregoing disclosure, therefore, it will be obvious that all of the initially recited objects of the present invention have been achieved.

Although the present invention has been described and illustrated in connection with preferred embodiments, it is to be understood that modifications and variations may be resorted to without departing from the spirit of the invention, as those skilled in this art will readily understand. Such modifications and variations are considered to be within the purview and scope of the present invention as defined by the appended claims.

What is claimed is:
1. Method of maintaining a chamber defined by a vessel under low vacuum which comprises the steps of
   pumping gas from the chamber to reduce the pressure within the chamber,
   moving a stream of loose solid particles of porous adsorbent material through the chamber to adsorb gas in the chamber and further reduce the pressure in the chamber,
   the stream of loose particles being moved through the chamber from adjacent a first wall portion of the vessel defining one extremity of the chamber to adjacent a second wall portion of the vessel defining an opposite extremity of the chamber along a path plurally traversing intermediate wall portions of the vessel joined between the first and second wall portions,
   removing the particles of adsorbent material from the chamber and passing the particles to a desorption zone,
   stripping from the particles in the desorption zone gas adsorbed in the chamber,
   pumping gas from the desorption zone,
   the particles being passed from the chamber to the desorption zone through a first passageway while restricting the flow of gas from the desorption zone to the chamber through the first passageway,
   removing stripped particles from the desorption zone,
   cooling the removed particles,
   returning cooled particles to the chamber through a second passageway,
   and restricting the flow of gas through the second passageway into the chamber with the cooled particles.
2. Method as defined in claim 1 in which the stream of loose particles moved through the chamber follows a helical path in contiguous relation with the inner surface of the intermediate wall portion of the vessel.
3. Method as defined in claim 1 including the step of passing relatively cold fluid in indirect heat interchange with the chamber to cool the chamber to a relatively low temperature.
4. Method as defined in claim 1 including the step of passing relatively cold fluid in indirect heat interchange with the chamber in a region displaced inwardly from the surface of the intermediate wall portion of the vessel and from the path of the stream of loose particles of adsorbent material.
5. Method as defined in claim 4 including the additional step of passing relatively cold fluid in indirect heat interchange with the chamber in a second region between the inner surface of the intermediate wall portions of the vessel and the path of the stream of loose particles of adsorbent material.

References Cited by the Examiner

UNITED STATES PATENTS

| 1,702,311 | 2/29 | Pantenburg | 55—195 X |
| 1,825,707 | 10/31 | Wagner | 55—79 |
| 2,808,980 | 10/57 | Alpert | 230—69 |

FOREIGN PATENTS

| 1,275,226 | 9/61 | France. |
| 1,286,991 | 1/62 | France. |

DONLEY J. STOCKING, *Primary Examiner.*

WARREN E. COLEMAN, LAURENCE V. EFNER,
*Examiners.*